(12) United States Patent
Kato et al.

(10) Patent No.: US 6,795,498 B1
(45) Date of Patent: Sep. 21, 2004

(54) DECODING APPARATUS, DECODING METHOD, ENCODING APPARATUS, ENCODING METHOD, IMAGE PROCESSING SYSTEM, AND IMAGE PROCESSING METHOD

(75) Inventors: Motoki Kato, Kanagawa (JP); Koji Obata, Tokyo (JP); Nobuhiro Igi, Kanagawa (JP); Hideyuki Narita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/576,594

(22) Filed: May 22, 2000

(30) Foreign Application Priority Data

May 24, 1999 (JP) .......................................... 11-143983

(51) Int. Cl.[7] ................................................. H04B 7/60
(52) U.S. Cl. ................................................. 375/240.01
(58) Field of Search ....................... 375/240.01, 240.12, 375/240.13, 240.14, 240.15, 240.16, 240.17, 240.29; 714/779, 746; 341/67; 386/68; H04B 7/66

(56) References Cited

U.S. PATENT DOCUMENTS

| | | | | |
|---|---|---|---|---|
| 5,715,008 A | * | 2/1998 | Sekiguchi et al. | 375/240.15 |
| 5,767,799 A | * | 6/1998 | Maertens et al. | 341/67 |
| 6,040,862 A | * | 3/2000 | Asai et al. | 375/240.12 |
| 6,088,396 A | * | 7/2000 | Takahashi | 375/240.16 |
| 6,201,927 B1 | * | 3/2001 | Comer | 386/68 |
| 6,289,485 B1 | * | 9/2001 | Shiomoto | 714/779 |
| 6,530,055 B1 | * | 3/2003 | Fukunaga | 714/746 |
| 2002/0126988 A1 | * | 9/2002 | Togashi et al. | 386/68 |

\* cited by examiner

*Primary Examiner*—Tung Vo
(74) *Attorney, Agent, or Firm*—Frommer Lawrence & Haug LLP; William S. Frommer; Bruno Polito

(57) ABSTRACT

An image processing system comprising a decoder 10 and an encoder 30. The decoder 10 comprises a section 12 for decoding a bit stream to generate image data, generating coding parameters for each layer and generating an error flag indicating whether the coding parameters can be effectively used. The encoder 30 comprises a control section 41, an MB-parameter calculating section 36, an encoding section 38 and a variable-length encoding section 39. The section 41 determines, from the error flag, whether or not the coding parameters can be effectively used or not. The section 36 calculates coding parameters when the coding parameters generated by the section 12 are invalid. The sections 38 and 39 encodes the image data by using the coding parameters generated by the section 12 when these parameters are valid, and by using the coding parameters calculated by the section 36 when the coding parameters generated by the section 12 are invalid.

19 Claims, 7 Drawing Sheets

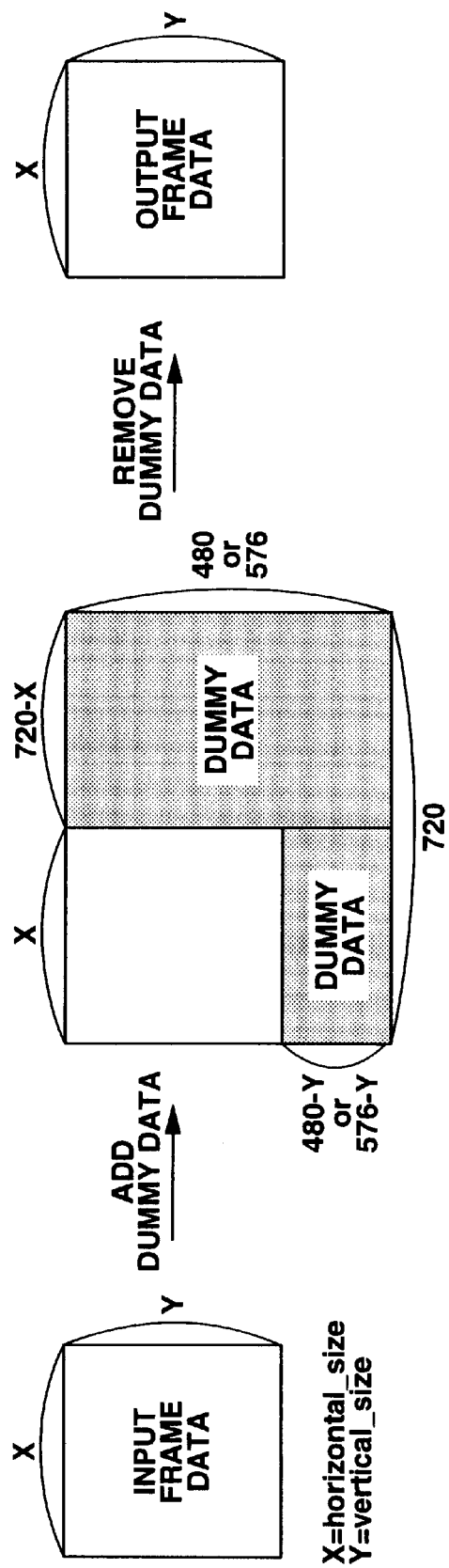

| PICTURE TIME | t1 | t2 | t3 | t4 | t5 | t6 | t7 | t8 | t9 | t10 |
|---|---|---|---|---|---|---|---|---|---|---|
| PROCESSING IN THE DECODER | | | | | | | | | | |
| (a) input bit-stream to decoder: | I2 | B0 | B1 | P5 | B3 | B4 | | | | |
| (b) output pictures from decoder: | | | B0 | B1 | I2 | P5 | B3 | B4 | | |
| (c) output SEQ_GOP_PIC_parameters(): | I2 | B0 | B1 | P5 | B3 | B4 | P5 | | | |
| (d) output picture_mb_parameters_valid: | | I2 | B0 | B1 | P5 | B3 | B4 | | | |
| PROCESSING IN THE ENCODER | | | | | | | | | | |
| (e) input pictures to encoder: | I2 | B0 | B1 | P5 | B3 | B4 | P5 | | | |
| (f) input SEQ_GOP_PIC_parameters(): | | I2 | B0 | B1 | P5 | B3 | B4 | | | |
| (g) input picture_mb_parameters_valid: | | I2 | B0 | B1 | P5 | B3 | B4 | | | |
| (h) output bit-stream from encoder: | | | | | I2 | B0 | B1 | P5 | B3 | B4 |

→ Time

FIG.3

| PICTURE TIME | t1 | t2 | t3 | t4 | t5 | t6 | t7 | t8 | t9 | t10 |
|---|---|---|---|---|---|---|---|---|---|---|
| PROCESSING IN THE DECODER | | | | | | | | | | |
| (a) input bit-stream to decoder: | I2 | B0 | B1 | P5 | B3 | B4 | | | | |
| (b) output pictures from decoder: | | | | B0 | B1 | I2 | B3 | B4 | P5 | |
| (c) decode MB_parameters(): | I2 | B0 | B1 | P5 | B3 | B4 | | | | |
| (d) output MB_parameters(): | | | | | | B4 | P5 | | B3 | B4 |
| PROCESSING IN THE ENCODER | | | | | | | | | | |
| (e) input pictures to encoder: | | | | B0 | I2 | B4 | B1 | P5 | B3 | B4 |
| (f) output bit-stream from encoder: | | | | | I2 | B0 | B1 | P5 | B3 | B4 |
| (g) input MB_parameters(): | | | | | I2 | B0 | B1 | P5 | B3 | B4 |

FIG.4

| PICTURE TIME | t1 | t2 | t3 | t4 | t5 | t6 | t7 | t8 | t9 | t10 | t11 | t12 | t13 | t14 | t15 | t16 |
|---|---|---|---|---|---|---|---|---|---|---|---|---|---|---|---|---|
| PROCESSING IN THE DECODER | | | | | | | | | | | | | | | | |
| (a) input bit-stream to decoder: | I2 | B0 | B1 | P5 | B3 | B4 | P8 | B6 | B7 | I2 | B0 | B1 | | | | |
| (b) output pictures from decoder: | | B0 | B1 | I2 | B3 | B4 | P5 | B6 | B7 | P8 | B0 | B1 | I2 | | | |
| (c) decode MB_parameters(): | I2 | B0 | B1 | P5 | B3 | B4 | P8 | B6 | B7 | I2 | B0 | B1 | | | | |
| (d) an error of MB layer occurs | | | | 1 | | | | | | | | | | | | |
| (e) output mb_parameters valid | 1 | 1 | 1 | 0 | 1 | 1 | 1 | 1 | 1 | 1 | 1 | 1 | | | | |
| (f) output MB_parameters(): | | | | | I2 | B0 | B1 | P5 | B3 | B4 | P8 | B6 | B7 | I2 | | |
| PROCESSING IN THE ENCODER | | | | | | | | | | | | | | | | |
| (g) input pictures to encoder: | | B0 | B1 | I2 | B3 | B4 | P5 | B6 | B7 | P8 | B0 | B1 | I2 | | | |
| (h) input MB_parameters(): | | | | | | | | | | B4 | P8 | | | | | |
| (i) input MB_parameters() valid? | | | | | 1 | 1 | 1 | 0 | 0 | 0 | 0 | 0 | 0 | 1 | 1 | 1 |
| (j) output bit-stream from encoder: | | | | | I2 | B0 | B1 | P5 | B3 | B4 | P8 | B6 | B7 | I2 | B0 | B1 |

→ Time

FIG.5

| PICTURE TIME | t1 | t2 | t3 | t4 | t5 | t6 | t7 | t8 | t9 | t10 | t11 | t12 | t13 | t14 | t15 | t16 | t15 | t16 |
|---|---|---|---|---|---|---|---|---|---|---|---|---|---|---|---|---|---|---|
| PROCESSING IN THE DECODER | | | | | | | | | | | | | | | | | | |
| (a) input bit-stream to decoder: | I2 | B0 | B1 | P5 | B3 | B4 | Pa | B6 | B7 | B8 | B9 | Pd | Bb | Bc | | | | |
| (b) M | 3 | | | 3 | | | 5 | | | | | 3 | | | | | | |
| (c) output pictures from decoder: | | B0 | B1 | I2 | B3 | B4 | P5 | B6 | B7 | B8 | B9 | Pa | Bb | Bc | Pd | | | |
| (d) decode MB_parameters() | I2 | B0 | B1 | P5 | B3 | B4 | Pa | B6 | B7 | B8 | B9 | Pd | Bb | Bc | | | | |
| (e) output MB_parameters() | | | | | I2 | B0 | B1 | P5 | B3 | B4 | Pa | B6 | B7 | B8 | B9 | Pd | Bb | Bc |
| PROCESSING IN THE ENCODER | | | | | | | | | | | | | | | | | | |
| (f) input pictures to encoder: | | B0 | B1 | I2 | B3 | B4 | P5 | B6 | B7 | B8 | B9 | Pa | Bb | Bc | Pd | | | |
| (g) B-picture counter | | 1 | 2 | 0 | 1 | 2 | 0 | 1 | 2 | 3 | 1 | 0 | 1 | 2 | 0 | | | |
| (h) change M? | | | | | | | | | | 1 | | | | | | | | |
| (i) re-calculate picture_coding_type: | | B0 | B1 | I2 | B3 | B4 | P5 | B6 | B7 | P8 | B9 | Pa | Bb | Bc | Pd | | | |
| (j) input MB_parameters(): | | | | | I2 | B0 | B1 | P5 | B3 | B4 | Pa | B6 | B7 | B8 | B9 | Pd | Bb | Bc |
| (k) input MB_parameters() valid? | | | | | 1 | 1 | 1 | 1 | 1 | 1 | 0 | 0 | 0 | 0 | 0 | 1 | 1 | 1 |
| (l) output bit-stream from encoder: | | | | | I2 | B0 | B1 | P5 | B3 | B4 | P8 | B6 | B7 | Pa | B9 | Pd | Bb | Bc |

→ Time

FIG.6

DECODING APPARATUS, DECODING METHOD, ENCODING APPARATUS, ENCODING METHOD, IMAGE PROCESSING SYSTEM, AND IMAGE PROCESSING METHOD

BACKGROUND OF THE INVENTION

The present invention relates to an decoding apparatus, a decoding method, an encoding apparatus, an encoding method, an image processing system and an image processing method, all fit for use in a system that encodes image data again. In particular, the invention relates a decoding apparatus and method for decoding a bit stream to generate image data and encoding parameters for use in encoding the image data again, to an encoding apparatus and method for encoding image data supplied from an encoding apparatus by using encoding parameters supplied therefrom, and to an image processing system and method for decoding a bit stream to generate image data, for generating encoding parameters for use in encoding the image data again and encoding image data supplied from a decoding apparatus by using encoding parameters supplied therefrom.

When a conventional system re-encodes an image signal encoded by an MPEG (Moving Picture Expert Group) system, the image signal re-encoded may be deteriorated in terms of image quality. One of the reasons for this deterioration is the discrepancy between the encoded signal and the re-encoded signal, with regard to some parameters, i.e., picture type, moving vector and the like.

An example of the deterioration of image quality, which has resulted from the change in the picture type, will be explained. Assume that there is a picture type of an input decoded image for one GOP (Group of Pictures). The GOP may consists of, for example, nine pictures (N=9)

B0, B1, I2, B3, B4, P5, B6, B7 and P8 that are based on the MPEG system. More precisely, the GOP consists of an I (Intra) picture, P (Predictive) pictures and B (Bidirectionally predictive) pictures.

Every three pictures (M=3) make one sub-group which begins with either an I picture or a P picture and which is followed by an I picture or a P picture. To lock this GOP in terms of phase, as shown below, the I picture contained in the input decoded image is used as the reference image, without being modified at all.

B0, B1, I2, B3, B4, P5, B6, B7, P8

Consider another picture type of an input decoded image for the following GOP, which is not phase-locked:

B0, I1, B2, B3, P4, B5, B6, P7

In this GOP, the third picture (B2), which is a B picture that may be greatly deteriorated in image quality, is used as the reference image in the process of encoding the image signal again. Consequently, the accuracy of re-encoding decreases, inevitably causing a great deterioration of image quality.

In the conventional encoders, not only the picture type, but also another coding parameter, e.g., the motion vector, may be maintained unchanged after the image signal is encoded again. If so, the image quality will deteriorate less than in the case where the values of the coding parameters, which have been calculated during the process of re-encoding the image signal are used. In the conventional encoders, all coding parameters, including the picture type and the motion picture, are maintained unchanged after the image is encoded again, whereby the quality of the image represented by the image signal encoded again scarcely deteriorated.

Errors may be added to the bit stream in the transmission path. The encoder that has encoded the original bit stream may use coding parameters that do not accord with the MPEG standards. In either case, the bit stream the decoder has received may have a syntax error may in some cases.

If a syntax error is made in the bit stream, the decoder searches for the next start code (a 32-bit synchronization code), from the position where the error has occurred in the bit stream, thereby accomplishing error recovery. The decoder cannot decode the signal included in a part of a bit stream that extends between the start point of the error-occurring position and the start point of the error-recovering position. Hence, the decoder uses, instead of image signals lost, the image data already decoded to conceal an error resulting from the image signal that has been lost due to the syntax error. That is, the decoder copies, for example, an image displayed in the past, and the image copied is displayed for that part of the image, which has been lost due to the syntax error.

As describe above, the conventional encoder may re-encode a decoded image signal under the condition that the coding parameter applied before the re-encoding and the coding parameter applied after the re-encoding are identical in terms of picture type or motion vector. When the decoder receives a bit stream having a syntax error, it conceals the error and outputs the concealed image data to the re-encoder. Then, the re-encoder receives no coding parameters, or receives the coding parameter having an error, from the decoder. If the encoder encodes the image signal by using the erroneous coding parameters supplied from the decoder, the image represented by the encoded image signal will have its quality greatly deteriorated.

As indicated above, hitherto the encoder encodes a bit stream, in most cases, by using the coding parameters supplied from the decoder, no matter whether a syntax error has occurred or not in the bit stream input to the decoder. The encoder cannot process the bit stream signal in a normal way, because it uses the erroneous coding parameters to encode the bit stream.

BRIEF SUMMARY OF THE INVENTION

The present invention has been made in view of the foregoing. The object of the invention is to provide a decoding apparatus and method which can generate data indicating that an error has occurred in a bit stream, an encoding apparatus and method which can encode perform-n good data-encoding even if an error has occurred in a bit stream, and an image processing system and method.

A decoding apparatus according to the present invention, designed to achieve the object, comprises: decoding means for decoding an input bit stream to generate image data; parameter generating means for generating coding parameters of each layer, to be used to encode the image data again, which has been generated by the decoding means; and error flag generating means for generating an error flag which indicates whether the coding parameters generated for each layer by the parameter generating means can be effectively used to encode the image data again.

A decoding method according to the invention comprises: decoding an input bit stream to generate image data; generating coding parameters of each layer, to be used to encode the image data again; and generating an error flag which indicates whether the coding parameters generated for each layer can be effectively used to encode the image data again.

An encoding apparatus according to this invention comprises: parameter evaluating means for determining whether coding parameters for each layer, which have been input from a decoding apparatus, can be used effectively to encode image data input from the decoding apparatus, from an error flag that indicates whether the coding parameters can be used effectively; parameter calculating means for calculating coding parameters from the image data supplied from the decoding apparatus, in accordance with data supplied from the parameter evaluating means and indicating that the coding parameters are invalid; and encoding means for encoding the image data by using the coding parameters input from the decoding apparatus when the parameter-evaluating mean determines that the coding parameters supplied from the decoding apparatus are valid, and by using the coding parameters generated by the parameter calculating means when the parameter-evaluating mean determines that the coding parameters supplied from the decoding apparatus are invalid.

Another encoding apparatus according to the invention comprises: counting means for counting a number of times image data of a prescribed picture type is continuously input from a decoding apparatus; picture type changing means for generating coding parameters in accordance with data supplied from the counting means and indicating that the count of the counting means has reached a predetermined value, so that the image data may be encoded to image data of a different picture type; and encoding means for encoding the image data by using the coding parameters supplied from the picture type changing means.

Still another encoding method according to this invention comprises: a process of determining whether coding parameters for each layer, which have been input from a decoding apparatus, can be used effectively to encode image data input from the decoding apparatus, from an error flag that indicates whether the coding parameters can be used effectively; a process of calculating coding parameters from the image data supplied from the decoding apparatus, in accordance with data indicating that the coding parameters supplied from the decoding apparatus are invalid; and a process of encoding the image data by using the coding parameters input from the decoding apparatus when the coding parameters supplied from the decoding apparatus are determined to be valid, and by using the coding parameters generated in the process of calculating coding parameters when the coding parameters supplied from the decoding apparatus are determined to be invalid.

Another encoding method according to the present invention comprises: counting a number of times image data of a prescribed picture type is continuously input from a decoding apparatus; generating coding parameters in accordance with data supplied from the counting means and indicating that the count of the counting means has reached a predetermined value, so that the image data may be encoded to image data of a different picture type; and encoding the image data by using the coding parameters supplied from the picture type changing means.

An image processing system according to the invention comprises a decoding apparatus and an encoding apparatus. The decoding apparatus comprises: a decoding apparatus comprising: decoding means for decoding an input bit stream to generate image data; parameter generating means for generating coding parameters of each layer, to be used to encode the image data again, which has been generated by the decoding means; and error flag generating means for generating an error flag which indicates whether the coding parameters generated for each layer by the parameter generating means can be effectively used to encode the image data again. The encoding apparatus comprises: parameter evaluating means for determining whether coding parameters for each layer, which have been input from a decoding apparatus, can be used effectively to encode image data input from the decoding apparatus, from an error flag that indicates whether the coding parameters can be used effectively; parameter calculating means for calculating coding parameters from the image data supplied from the decoding apparatus, in accordance with data supplied from the parameter evaluating means and indicating that the coding parameters are invalid; and encoding means for encoding the image data by using the coding parameters input from the decoding apparatus when the parameter-evaluating mean determines that the coding parameters supplied from the decoding apparatus are valid, and by using the coding parameters generated by the parameter calculating means when the parameter-evaluating mean determines that the coding parameters supplied from the decoding apparatus are invalid.

Another image processing system according this invention comprises: decoding means for decoding an input bit stream to generate image data; inverse quantization means for performing inverse quantization on the image data supplied from the decoding means, thereby to generate DCT coefficients; quantization means for performing quantization on the DCT coefficients supplied from the inverse quantization means, thereby to generated image data; parameter generating means for generating coding parameters for each layer, to be used to encode the image data decoded by the decoding means; error flag generating means for generating an error flag which indicates whether the coding parameters generated for each layer by the parameter generating means can be effectively used to encode the image data again; calculating means for calculating coding parameters in accordance with the error flag supplied from the error flag generating means; encoding means for encoding the image data supplied from the quantization means, by using the coding parameters supplied from the parameter generating means or the calculating means; and control means for causing the encoding means to encode the image data by using the coding parameters generated by the parameter generating means, when the encoding parameters are determined to be valid, from the error flag generated by the error flag generating means, and by using the coding parameters generated by the calculating means, when the encoding parameters generated by the parameter generating means are determined to be invalid, from the error flag generated by the error flag generating means.

Still another image processing method according to the invention comprises: a process of decoding an input bit stream to generate image data, generating coding parameters of each layer, to be used to encode the image data again, and an error flag which indicates whether the coding parameters generated for each layer may be effectively used to encode the image data again; a process of performing inverse quantization on the image data supplied from the decoding means, thereby to generate DCT coefficients; a process of performing quantization on the DCT coefficients supplied from the inverse quantization means, thereby to generated image data; a process of calculating coding parameters in accordance with the error flag; and a process of encoding the image data by using the coding parameters generated in the process of decoding the input bit stream, when it is determined from the error flat that the encoding parameters are valid, and by using the coding parameters generated in the process of calculating coding parameters, when it is determined from the error flat that the encoding parameters are invalid.

In the decoding apparatus and the decoding method, both according to the present invention, it is possible to generate an error flag that indicates whether or not the coding parameters for each layer can be effectively used to encode image data again. The coding parameters for use in encoding the image data again can therefore be controlled after they are decoded. Hence, when the coding parameters decoded are invalid, they are not used, and the coding parameters generated by the encoder are used, thereby accurately encoding the image data again.

In the coding apparatus and the coding method, both according to the present invention, the image data is encoded by using the coding parameters input from the decoding apparatus when the coding parameters supplied from the decoding apparatus are determined to be valid, and by using the coding parameters generated by the process of calculating coding parameters when the coding parameters supplied from the decoding apparatus are invalid. Thus, when the coding parameters supplied from the decoding apparatus are valid, the input image is coded again by using the coping parameters for the image data. When the coding parameters supplied from the decoding apparatus are invalid, the coding parameters generated in the encoding apparatus or method are used to encode the image data again. Hence, the coding apparatus and method do not use the coding parameters specified by error flags, and can therefore accurately encode the image data again. As a result, the image data thus encoded again can represent a high-quality image.

In other coding apparatus and coding method according to this invention, a number of times image data of a prescribed picture type is continuously input from a decoding apparatus is counted, and the picture type of the image data is changed to another in accordance with data supplied from the counting means and indicating that the count of the counting means has reached a predetermined value. Therefore, the image data can be encoded to image data of a different picture type. The coding parameters generated to change the picture type are used, thereby encoding the image data. Thus, it is possible to change the coding parameters to encode the image data again, even if the coding parameters input from the decoding apparatus are ones that cannot be encoded in the encoding apparatus. Hence, the image data thus encoded again can represent a high-quality image.

An image processing system according to the invention comprises a decoding apparatus and an encoding apparatus. The decoding apparatus comprises error flag generating means for generating an error flag which indicates whether the coding parameters generated for each layer by the parameter generating means can be effectively used to encode the image data again. The encoding apparatus comprises: parameter evaluating means for determining whether coding parameters for each layer, which have been input from a decoding apparatus, can be used effectively to encode image data input from the decoding apparatus, from an error flag that indicates whether the coding parameters can be used effectively; parameter calculating means for calculating coding parameters from the image data supplied from the decoding apparatus, in accordance with data supplied from the parameter evaluating means and indicating that the coding parameters are invalid; and encoding means for encoding the image data by using the coding parameters input from the decoding apparatus when the parameter-evaluating mean determines that the coding parameters supplied from the decoding apparatus are valid, and by using the coding parameters generated by the parameter calculating means when the parameter-evaluating mean determines that the coding parameters supplied from the decoding apparatus are invalid. Therefore, the encoding apparatus encodes the image data again by using the coding parameters input from the decoding apparatus when the coding parameters supplied from the decoding apparatus are valid, and by using the coding parameters generated by the parameter calculating means when the coding parameters supplied from the decoding apparatus are invalid. Hence, the coding apparatus and method do not use the coding parameters specified by error flags, and can therefore accurately encode the image data again. The image data thus encoded again can therefore represent a high-quality image.

Another image processing system and another image processing method, according to the present invention, performs a decoding process, in which an input bit stream is decoded into image data and an error flag is generated, which indicates whether the coding parameters generated for each layer may be effectively used to encode the image data again. The system and method further perform an encoding process, in which coding parameters are calculated in accordance with the error flag, the image data is encoded by using the coding parameters generated in the process of decoding the input bit stream, when it is determined from the error flat that the encoding parameters are valid, and by using the coding parameters generated in the process of calculating coding parameters, when it is determined from the error flat that the encoding parameters are invalid. Thus, the image data again is encoded again by using the coding parameters input from the decoding apparatus when the coding parameters supplied from the decoding apparatus are valid, and by using the coding parameters generated by the parameter calculating means when the coding parameters supplied from the decoding apparatus are invalid. Hence, the image processing system and the image processing method do not use the coding parameters specified by error flags, and can therefore accurately encode the image data again. The image data thus encoded again can therefore represent a high-quality image.

BRIEF DESCRIPTION OF THE SEVERAL VIEWS OF THE DRAWING

FIG. 2A is a diagram illustrating image data having a size x measured in the horizontal direction and a size y measured in the vertical direction;

FIG. 2B is a diagram for explaining the process of adding a dummy error to image data;

FIG. 2C is a diagram for explaining the process of removing the dummy error from the image data;

FIG. 3 is a timing chart explaining the timing of inputting parameter-evaluating data and the like from the decoder to the encoder in the image processing system according to the invention;

FIG. 4 is a timing chart explaining the timing of inputting MB parameters and the like from the decoder to the encoder in the image processing system according to the invention;

FIG. 5 is a timing chart representing the timing of performing a process in the case where the coding parameters input from the decoder to the encoder are invalid in the image processing system according to the invention;

FIG. 6 is a timing chart explaining the timing of the process of referring to the MB parameters of picture_coding_type input to the encoder in the order pictures should be displayed, thereby to achieving encoding by changing the number of B pictures to the number of P pictures in accordance with a count value.

DETAILED DESCRIPTION OF THE INVENTION

Embodiments of the present invention will be described in detail, with reference to the accompanying drawings.

Figure 1:
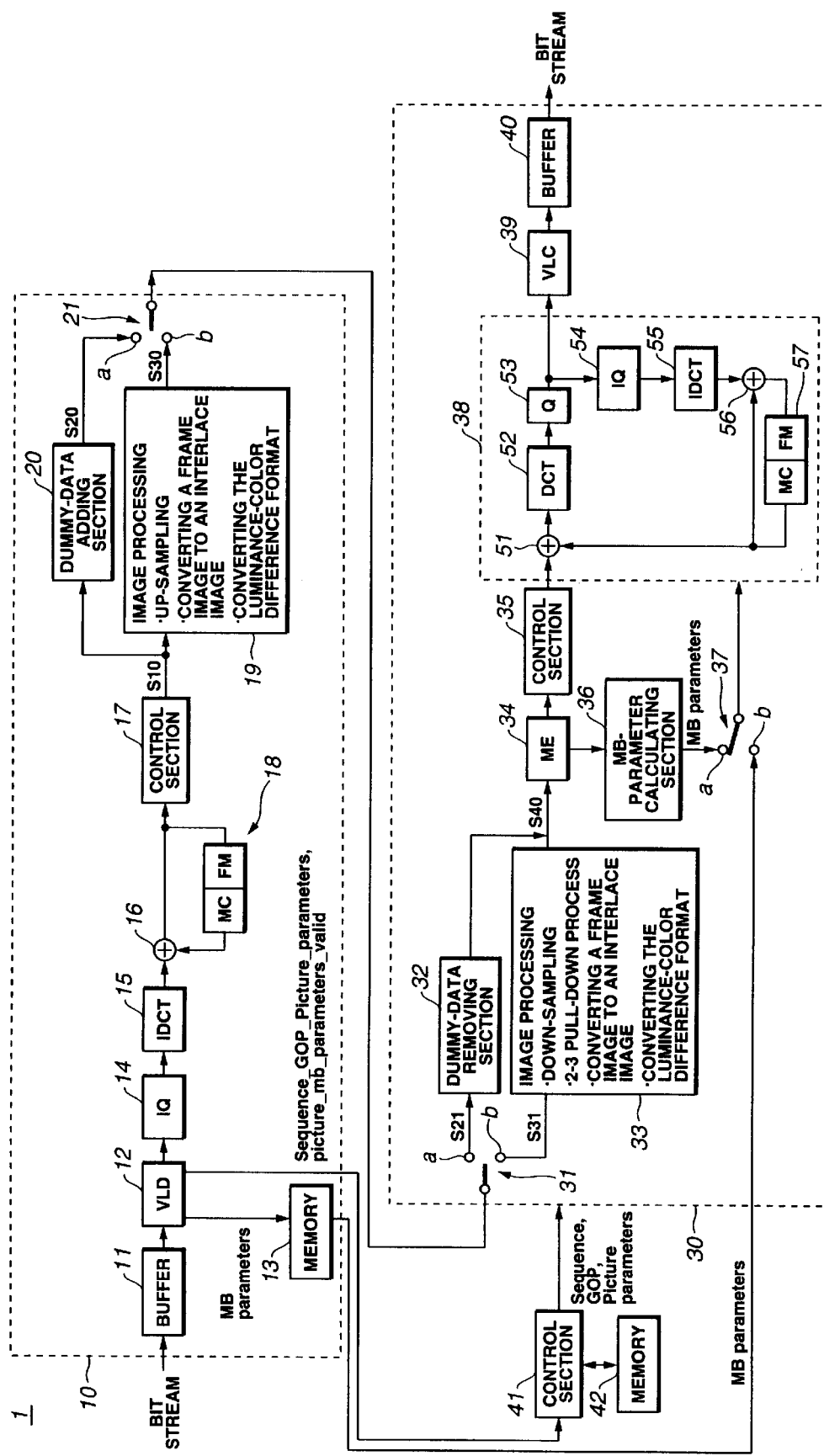
FIG. 1 is a block diagram showing an image processing system according to the present invention.

This invention is applied to, for example, an image processing system 1 of the type shown in FIG. 1.

The image processing system 1 comprises a decoder 10 and an encoder 30, which are cascade-connected. The decoder 10 receives a bit stream from an external apparatus. The bit stream is one encoded in accordance with the MPEG2 standards. The encoder 30 encodes the image data decoded by the decoder 10, or encodes the image data again, thus outputting the image data, in the form of a bit stream, to an external apparatus.

The decoder 10 comprises a buffer 11, which receives a bit stream encoded in accordance with the MPEG2 standards and supplied from the external apparatus. The buffer 11 temporarily stores the bit stream and then outputs the same to a variable-length decoding (VLD) section 12.

The variable-length decoding section 12 performs variable length decoding on the bit stream in units of, for example, macro blocks (MBs), obtaining a quantization coefficient and a motion vector. The quantization coefficient and motion vector, thus obtained, are output to an inverse quantization (IQ) section 14.

The variable-length decoding section 12 performs not only variable length decoding, but also detects the coding parameters (hereinafter called "MB parameters") added to each MB layer. The MB parameters are output to a memory 13. Moreover, the variable-length decoding section 12 detects the coding parameter (sequence_GOP_picture_parameters) of a picture layer and generates data (picture_mb_parameters_valid) indicating whether the coding parameters of the picture layer and the MB parameters are valid or not. This data is output to a control section 41 that is connected to the output of the variable-length decoder section 12.

The Sequence_GOP_Picture_parameters include the following parameters that are defined in the MPEG2 standards.

The bit stream input to the variable-length decoding section 12 contains a sequence extension (Sequence_extension) arranged immediately after a sequence header, a sequence display extension (Sequence_display_extension), and a sequence scalable extension (Sequence_scalable_extension). A GOP header (group_of_pictures_header) is added, following these extensions.

Further, the bit stream contains a picture header (picture header) that holds data about an I (Inter) picture (i.e., intra-frame coded picture), a P (Predicitive) picture (i.e., inter-frame, forward predictive coded picture) and a B (Bidirectionally predictive) picture (i.e., bidirectionally predictive coded picture). The bit stream also contains other extensions, such as a picture coding extension (picture_coding_extension), a quantization matrix extension (quant matrix extension), a picture display extension (picture_display_extension) and the like.

The coding parameters of the picture layer also include parameters such as horizontal_size, vertical_size, picture_coding_type, top_field_first, repeat_first_field and the like.

The MB parameters described above are coding parameters of the MB layer.

They include the following parameters that are defined in the MPEG2 standards.

That is, the MB layer contains a macro block address, a quantization scale representing the size of the quantization step, a flag indicating that the quantization scale is valid (set to "0" when the MB is a skip MB or an MB not coded), a DCT type showing whether the DCT is in the frame mode, field mode or dual mode, a motion compensation type indicating that motion compensation is achieved in the frame mode, field mode or dual mode, an MB mode showing that the motion prediction is predicted in the forward direction, reverse direction or both directions, a motion vector, a reference field for a field motion vector, and an auxiliary vector for dual prime.

The variable-length decoding section 12 sets the DCT type to the frame mode if the macro block to be decoded is an "MB not coded", that is, if the macro block is other than an intra MB and has no coded_block_pattern.

The variable-length decoding section 12 sets the DCT type and the motion compensation type to the frame mode and the frame prediction, respectively, if the macro block is a skip MB. The section 12 sets the MB mode to the forward prediction for a P picture, sets the MB mode, for a B picture, to the prediction starting with the immediately preceding MB, and sets the motion vector at 0 (zero) for a P picture and, for a B picture, at the same value set for the immediately preceding MB.

As mentioned above, the variable-length decoding section 12 outputs various coding parameters for the sequence layer, GOP layer, picture layer and MB layer.

Moreover, the section 12 generates parameter-evaluating data. The parameter-evaluating data is a two-bit flag. Of the two bits, one indicates whether the coding parameter of the picture layer is valid or not, while the other indicates whether the MB parameter is valid or not, as will be shown in Table 1 presented below.

TABLE 1

| picture_mb_parameters_valid | parameter of picture layer | parameter of MB layer |
| --- | --- | --- |
| 00 | invalid | invalid |
| 10 | valid | invalid |
| 11 | valid | valid |

More specifically, the variable-length decoding section 12 set the flag to "00" when the coding parameters of the picture layer and MB layer have errors, or they are invalid, to "10" when the coding parameter of the picture layer has no errors, or it, is valid and the coding parameter of the MB layer has an error, or it is invalid, and to "11" when neither the coding parameter of the picture layer nor the coding parameter of the MB layer has an error. The parameter-evaluating data, thus generated, is output from the section 12 to the control section 41.

The parameter of the picture layer may contains an error if, for example, an error occurred in the bit stream while the variable-length decoding section 12 of the decoder 10 is performing decoding. In this case, the image data output from the decoder 10 until the error is recovered by detecting the header of the next GOP, by means of data concealing, does not have picture_coding_type. Hence, the coding parameter of the picture layer contains an error. The control section 41, later described, will determine that this coding parameter is invalid.

The MB parameter may be invalid when the picture decoded contains an error in the bit stream. In this case, the MB parameter contains an error and the control section 41 determines, which will be described later, that the MB parameter is invalid.

Furthermore, the decoding section 12 outputs top_field_first and repeat_first_field to the control section 41. The field image input to the section 41 is one of the field images represented by the image data to be output via a switch section 21 to the encoder 30. The encoder 30 can therefore encode the field image input to a switch section 31 and output a field image that is identical to the input field image.

Top_field_first described above is a flag that indicates which should be displayed first, the top field or bottom field of a frame-structured picture in an interlace image. Repeat_first_field, also described above, is a flag indicating whether or not the field first display should be displayed again after the field displayed next, in the process of displaying the frame-structured image.

The MB parameter is input from the variable-length decoding section 12 to the memory 13. The control section 41 controls the delay of a prescribed picture time (later described), in accordance with the process timing of the encoder 30.

The inverse quantization section 14 quantizes the image data containing the quantization coefficient that has been supplied from the variable-length decoding section 12. More precisely, the section 14 quantizes the image data in units of, for example, pixel blocks each consisting of 8×8 pixels. The inverse quantization section 14 performs, on the image data, inverse quantization in which the image data is multiplied by the quantization step, thereby generating an DCT coefficient. The image data thus quantized is output to an inverse discrete cosine transform (IDCT) section 15.

The inverse DCT section 15 effects inverse discrete cosine transform on the image data supplied from the inverse quantization section 14, in units of, for example, 8×8-pixel blocks. The inverse DCT section 15 calculates pixel values (luminance and color difference) of each 8×8-pixel block. The image data consisting of the pixel values generated by the inverse transform is output from the inverse DCT section 15 to an adder 16.

The adder 16 adds the image data output from the inverse DCT section 15 to the image data supplied from a motion compensation section 18. The sum of the image data items is output to a control section 17.

The motion compensation (MC) section 18 has a frame memory (FM) for if storing image data items, each preceding or following another in time sequence. The section 18 reads the image data of each picture type, which has been predicted on the basis of the motion vector, from the frame memory. The image data is supplied to the adder 16. The adder 16 adds this image data to the image data output from the inverse DCT section 15, whereby motion compensation is accomplished.

The control section 17 changes the frames supplied from the adder 16 and arranged in the order they have been decoded, generating a frame-image sequence consisting of frames arranged in the order they will be displayed. The frame-image sequence thus generated is output to an image processing section 19.

The image processing section 19 changes the size of the image represented by the image data input from the control section 17, if the encoder 30 connected to the output of the section 19 will encode the image again by changing the size of the image. The image processing section 19 outputs, for example, an image made up of 720 pixel×480 pixels to the switch section 21 in the form of image data S30 representing an image composed of 352 pixel×480 pixels.

The image processing section 19 interpolates pixels arranged in the vertical direction and horizontal direction, in each of the pictures composing the image data supplied from the control section 17. That is, the section 19 performs an up-assembling process, whereby each picture has a higher resolution higher than it had when input to the image processing section 19.

The image processing section 19 converts each of the pictures composing the input bit stream, which is a frame image, to an interlace image, in accordance with the top_field_first and the repeat_first_field, both added to the picture header of the picture.

The image processing section 19 converts the luminance-color difference format of each picture, which represents the ratio between the luminance signal, color-difference signal Cb and color-difference signal Cr of the picture. To state more specifically, the image processing section 19 switches the luminance-color difference format, from one showing the ratio of 4:2:0 to another showing the ratio of 4:2:2. The ratio of 4:2:0 indicates that the color data has been reduced to half for the picture, both in the horizontal direction and the vertical direction. The ratio of 4:2:2 indicates that the color data has been reduced to half for the picture, in the horizontal direction only.

The image processing section 19 outputs the image data S30 to the encoder 30 through the switch section 21. It should be noted that this image data S30 has been subjected to the up-sampling process, the process of rewriting the picture header to change the frame image to a field image and the process of converting the luminance-color difference format, all described above.

The encoder 30 may encode the image data again, without changing the size of the image. If this is the case, a dummy-data adding section 20 adds dummy data to the image data which has, for example, a size x and a size y measured in the horizontal direction and the vertical direction, respectively, as is shown in FIG. 2A, thereby generating image data S20 that is illustrated in FIG. 2B. The image data S20 thus generated is output to the encoder 30 through the switch section 21.

A dummy-data adding section 20 adds dummy data to the image data S10 supplied from the control section 17 if it is determined that the size of any picture of the image data S10 has a size smaller than the size of 720 pixels×480 pixels or the size of 720 pixels×576 pixels. The section 20 thereby generates image data that is composed of 720 pixels×480 pixels or 720 pixels×576 pixels. More correctly, if the image data S10 supplied from the control section 17 is smaller than a 720×480-pixel image or a 720×576-pixel image, the dummy-data adding section 20 adds two dummy data items to the image data. The first dummy data consists of (720-x)×480 pixels or dummy data of (720-x)×576 pixels for the horizontal direction of the picture represented by the image data. The second dummy data consists of (720-y)×480 pixels or dummy data of (720-y)× 576 pixels for the vertical direction of the picture.

The switch section 21 closes or opens in accordance with a control signal supplied from the control section 4 1that is connected to it. When the switch section 21 is connected to the output terminal a of the dummy-data adding section 20, the image data S20 is output from the section 20 to the encoder 30. On the other hand, when the switch section 21 is connected to the output terminal b of the image processing section 19, the image data S30 is output from the section 19 to the encoder 30.

The control section 41 receives the coding parameters (Sequenc_GOP_Picture_Parameters) of the picture layer, from the variable-length decoding section 12, and outputs sequence_parameters, GOP_parameters and picture_parameters to the encoder 30. The control section 41 receives the parameter-evaluating data from the variable-length decoding section 12, too. (The parameter-evaluating data has been explained with reference to Table 1.) The control section 41 stores the coding parameters and the parameter-evaluating data into a memory 42.

The control section 41 outputs control signals to the switch sections 21 and 31. It also outputs a control signal to a switch section 37. These control signals control the opening/closing timing of the switch sections 21, 31 and 37 to control the process timing of the decoder 10 and encoder 30. At this time, the control section 41 refers to the parameter-evaluating data, thereby determining whether the encoding parameters of the picture layer are valid or not and whether the MB parameter is valid or not. Based on what it has determined, the control section 41 generates a control signal for opening or closing the switch section 37. To generate the control signals, the control section 41 has stored the parameters into the memory 42, which functions as a working memory.

The encoder 30 comprises a switch section 31. It is to die switch section 31 that the image data S20 or the image data S30 is input from the switch section 21.

The switch section 31 opens or closes in accordance with a control signal supplied from the control section 41. When the switch section 31 is connected to the output terminal a of a dummy-data removing section 32, the image data S20 output from the decoder 10 is input to the dummy-data removing section 32. When the switch section 31 is connected to the output terminal b of an image processing section 33, the image data S30 output from the decoder 10 is input to the image processing section 33.

The dummy-data removing section 32 removes the dummy data from the image data supplied from the switch section 31 as is illustrated in FIG. 2C and outputs the image data to a motion estimation section 34. In other words, the dummy-data removing section 32 removes the dummy data added to the image data S20 (FIG. 2B) supplied from the decoder 10, thus generating image data that contains no dummy data.

The image processing section 33 processes the image data S31 input from the switch section 31, generating image data S40 which has a size different from the size changed by the image processing section 19. The image data S40 is output to motion estimation section 34. The image processing section 33 outputs, for example, image data representing a 720×480-pixel image, instead of the image data representing a 352×480-pixel image. In this case, the image data showing the 720×480-pixel image is output to the motion estimation section 34.

Further, the image processing section 33 performs 2–3 pull-down process on the image data S31. That is, the section 33 converts, for example, a film image consisting of 24 picture per second into image data composed of 30 frames per second.

The image processing section 33 extracts some pixels arranged in the vertical and horizontal directions from each of the pictures composing the image data S31. In other words, the section 33 effects down sampling, generating pictures which have a resolution lower than that of the pictures input to the it from the switch section 31.

Moreover, the image processing section 33 converts each of the pictures composing the bit stream input to it, from an interlace image to a frame image, in accordance with the top_field_first and the repeat_first_field, both added to the picture header of each picture.

Still further, the image processing section 33 converts the luminance-color difference format of each picture, which represents the ratio between the luminance signal, color-difference signal Cb and color-difference signal Cr of the picture. To put it more precisely, the image processing section 33 switches the luminance-color difference format, from one showing the ratio of 4:2:2 to another showing the ratio of 4:2:0. The ratio of 4:2:2 indicates that the color data has been reduced to half for the picture, in the horizontal direction. The ratio of 4:2:0 indicates that the color data has been reduced to half for the picture, both in the horizontal direction and the vertical direction.

The image processing section 33 outputs the image data S40 to the motion estimation section 34. It should be noted that this image data S40 has been subjected to the 2–3 pull-down process, the down-sampling process, the process of rewriting the picture header to change the frame image to a field image and the process of converting the luminance-color difference format, all described above.

The motion estimating section 34 calculates motion vectors, in units of MBs, from the image data S40 supplied from the switch section 31 or the dummy-data removing section 32. The motion estimation section 34 forward estimation, reverse estimation or bidirectional estimation. In the forward estimation, a motion is estimated from the image displayed in the past. In the reverse estimation, the motion is estimated from the image to be displayed in the future. In the bidirectional estimation, the motion is estimated from both the image displayed in the past and the image to be displayed in the future. The motion vectors thus calculated are output to a control section 35 and an MB-parameter calculating section 36, together with the image data representing the MBs.

The control section 35 changes the frame-image sequence supplied from the motion estimation section 34 and consisting of frames arranged in the order they should be displayed, thus generating a frame-image sequence consisting of frames arranged in the order they will be encoded. The frame-image sequence thus generated is output to an encoding section 38.

The MB-parameter calculating section 36 generates MB parameters from the motion vectors of the MBs, which have been supplied to it from the motion estimation section 34. The section 36 outputs these MB parameters to the switch section 37.

The switch section 37 opens or closes in accordance with a control signal supplied from the control section 41. When the switch section 37 is connected to the output terminal a of the MB-parameter calculating section 36, the MB parameters calculated by the section 36 are supplied to the encoding section 38. When the switch section 37 is connected to the output terminal b of the decoder 10, the MB parameters generated in the decoder 10 are supplied to the encoding section 38.

The encoding section 38 comprises an adder 51, a DCT section 52, a quantization (Q) section 53, an inverse quantization (IQ) section 54, an inverse DCT (IDCT) section 55, an adder 56, a frame memory (FM) 57a, and a motion compensation (MC) section 57b. The adder 51 receives the image data from the control section 35, in units of MBs. The DCT section 52 carries out inverse discrete cosine transform on the image data supplied from the adder 51, in units of MBs. The quantization section 53 quantizes the DCT coefficients that constitute the image data supplied from the DCT section 52.

The motion compensation (MC) section 57b has a frame memory (FM) for storing the image data items, each preceding or following another in time sequence. The section 57b reads from this frame memory the image data, which has been predicted on the basis of the motion vector. The image data is supplied to the adders 51 and 56. The adders 51 and 56 perform addition, whereby motion compensation is accomplished.

Having the structure described above, the encoding section 38 encodes the image data in units of MBs, thereby generating image data that consists of I pictures, P pictures and B pictures, which accord with the MPEG standards. The image data thus generated is output to a variable-length encoding section 39.

The variable-length encoding section 39 effects variable-length compression on the image data supplied from the encoding section 38 and composed of MBs, each containing a quantization coefficient. More precisely, the variable-length section 39 performs the variable-length compression by utilizing the Haffman coding, thus converting the image data to a bit stream. The bit stream is output to a buffer 40.

The buffer 40 temporarily stores the bit stream supplied from the variable-length encoding section 39. The bit stream, which has been obtained by encoding the image data again, is output to the external apparatus.

How the decoder 10 inputs the coding parameters for the picture layer, the parameter-evaluating data and the like to the encoder 30 in the image processing system 1 described above operates will be described below, with reference to the timing chart of FIG. 3.

First, a bit stream composed of pictures I2, B0, B1, P5, B3 and B4 arranged in the order mentioned is input to the buffer 11 of the decoder 10 at times t1 to t6, respectively, as is illustrated at (a) in FIG. 3.

As shown at (c) in FIG. 3, the variable-length decoding section 12 detects sequence_GOP_picture_parameters of the picture layer for the pictures I2, B0, B1, P5, B3 and B4, at the same time the bit stream is input to the buffer 1 at times t1 to t6, respectively. The sequence_GOP_picture-parameters, thus detected, are output to the control section 41.

The variable-length decoding section 12 generates picture_mb_parameters_valid every time the pictures are subjected to variable-length decoding. The section 12 thereby delays the bit stream by a one-picture time with respect to that timing of inputting the bit stream to the buffer 11, which is shown at (a) in FIG. 3. The variable-length decoding section 12 outputs the parameter-evaluating data for the pictures I2, B0, B1, P5, B3 and B4, to the control section 41 at times t2 to t7, respectively.

As shown at (b) in FIG. 3, the switch section 21 of the decoder 10 delays the image data processed by the image processing section 19 or the dummy-data adding section 20, by a one-picture time with respect to the timing of inputting the bit stream to the buffer 11. The pictures B0, B1, I2, B3, B4 and P5 are thereby output to the encoder 30 in the order they are mentioned, at times t2 to t7, respectively.

While the decoder 10 is processing the image data as shown at (a) to (d) in FIG. 3, the pictures B0, B1, I2, B3, B4 and P5, which constitute the image data, are sequentially input to the encoder 30 at times t2 to t7, respectively, as shown at (e) in FIG. 3. These pictures B0, B1, I2, B3, B4 and P5 are not delayed with respect to that timing of outputting the image data from the decoder 10, which is illustrated at (b) in FIG. 3.

As shown at (f) in FIG. 3, the coding parameters of the picture layer (i.e., sequence_GOP_picture_parameters) are sequentially input for the pictures I2, B0, B1, P5, B3 and B4, from the decoder 10 to the encoder 30 via the control section 41. These coding parameters are not delayed with respect to the timing of outputting the sequence_GOP_picture_parameters from the variable-length decoding section 12, which is illustrated at (c) in FIG. 3.

The parameter-evaluating data items for the pictures I2, B0, B1, P5, B3 and B4 supplied from the variable-length decoding section 12 of the decoder 10 are input to the encoder 30 in the order they are mentioned as shown at (g) in FIG. 3, without being delayed. These parameter-evaluating data items are input from the decoder 10 to the encoder 30 through the control section 41 at times t2 to t7, respectively.

In the encoder 30, the bit stream is output from the buffer 40 at picture times t5 to t10 as shown at (h) in FIG. 3. Times t5 to t10, i.e., the timing of encoding image data of the GOP in which M=3, are respectively delayed by three-picture time from times at which the image data is input as shown at (e) in FIG. 3. At this time, the pictures I2, B0, B1, P5, B3 and B4 are output from the encoder 30 in the order they are mentioned.

It is necessary to store the coding parameters of the picture layer in the memory 42 for the picture time the encoder 30 needs to encode the image data. In the present embodiment, the control section 41 controls the encoder 30 such that the memory 42 stores the coding parameters for a four-picture time (t1 to t4) in order to output a bit stream composed of a GOP in which M=3, in accordance with the MPEG2 standards. Thus, the encoder 30 can output a bit stream encoded and containing the coding parameters.

The timing of inputting MB parameters and the like from the decoder 10 to the encoder 30 in the image processing system described above will be described, with reference to the tinning chart of FIG. 4.

In the decoder 10, a bit stream consisting of pictures I2, B0, P5, B3 and B4 arranged in the order mentioned is input to the buffer 11 for a period from time t 1 to time t6, as is illustrated at (a) in FIG. 4.

The variable-length decoding section 12 of the decoder 10 decodes the input bit stream without delaying these parameters with respect to the timing of inputting the bit stream to the buffer 11, i.e., the period from time t1 to time t6. The section 12 thereby generates MB parameters (MB_parameters) for the pictures I2, B0, B1, P5, B3 and B4, one after another, as is illustrated at (c) in FIG. 4.

The variable-length decoding section 12 of the decoder 10 outputs the MB parameters generated at the timing shown at (c) in FIG. 4, with a four-picture time delay. That is, the section 12 outputs the MB parameters of the pictures I2, B0, B1, P5, B3 and B4 at times t5 to t10, respectively.

If the GOP has the M value of 3 (M=3), the control section 41 causes the memory 13 to store the MB parameters for a four-picture time (i.e., a 4-frame time), before the MB parameters are output to the encoder 30.

The decoder 10 delays the image data by a one-picture time with respect to the bit stream, as is illustrated at (b) in FIG. 4, and outputs the pictures B0, B1, I2, B3, B4 and P5 of the image data to the encoder 30, in the order they are mentioned, respectively at times t2 to t7.

As the decoder 10 processes the image data as shown at (a) to (d) in FIG. 4, the encoder 30 receives the pictures B0, B1, I2, B3, B4 and P5 of the image data one after another, at times t2 to t7 as shown at (e) in FIG. 4. The pictures, which are not delayed with respect to the output timing, illustrated at (b) in FIG. 4.

The MB parameters of the pictures I2, B0, B1, P5, B3 and B4 are input to the encoder 30 in the order mentioned, respectively at times t5 to t10, without being delayed with respect to the timing of outputting them, wvhich is shown at (d) in FIG. 4.

Further, the encoder 30 uses the MB parameters input at the timing shown at (g) in FIG. 4. More specifically, the encoding section 38 uses the MB parameters, encoding the image data into a bit stream composed of pictures I2, B0, B1, P5, B3 and B4. The pictures I2, B0, B1, P5, B3 and B4 are delayed by a three-picture time as shown at (f) in FIG. 4, with respect to the timing of inputting the image data to the encoder 30, which is illustrated at (e) in FIG. 4. The I2, B0, B1, P5, B3 and B4 are then output from the encoder 30 in the order mentioned, respectively at times t5 to t10.

In the encoder 30, the coding parameters of the picture layer must be stored in the memory 42 for a picture time required to encode the input bit stream. In this embodiment, the control section 41 controls the encoder 30 such that the bit stream is output for a period (t1 to t4), with a delay of a three-picture time with respect to the timing of inputting the image data, if the bit stream is composed of a GOP in which M=3.

How the image data is processed in the image processing system 1 on the basis of the parameter-evaluating data supplied from the decoder 10 will be described below.

In the image processing system 1, the variable-length decoding section 12 generates parameter-evaluating data, and the control section 41 determines from the parameter-evaluating data whether the coding parameters and MB parameters of a picture layer are valid or invalid. The control section 41 selects coding parameters, which the encoder 30 will use to encode the input image data.

More specifically, the control section 41 detects a flag from the parameter-evaluating data supplied from the variable-length decoding section 12. If the flag indicates that the coding parameters of the picture layer and the MB parameters are valid, not containing errors, the encoder 30 will encode the image data input from the decoder 10, by using the same coding parameters as those added to the bit stream input to the decoder 10.

To decrease the bit rate, the control section 41 controls the encoder 30 such that the encoder 30 alters only the coding parameter representing the quantization scale and performs encoding. As for the other coding parameters, the control section 41 controls the encoder 30 performs encoding, by using the coding parameters added to the bit stream input to the decoder 10.

The control section 41 causes the encoder 30 to perform encoding by the use of only the coding parameters of the picture layer, thereby to change the image size. At this time, the control section 41 controls the encoder 30 such that the coding parameters to be used to achieve this encoding are rendered identical to the coding parameters added to the bit stream input to the decoder 10, with regard to at least picture_coding_type, top_field_first, and repeat_first_field. Further, the control section 41 invalidates the MB parameters supplied from the variable-length decoding section 12. It then controls the switch section 37 so that the encoding section 38 may encode the image data by using all coding parameters of the MB layer, which have been calculated by the MB-parameter calculating section 36.

In the image processing system 1 described above, the control section 41 may detects a flat showing that the coding parameters of the picture layer and the MB parameters are invalid, containing errors, from the parameter-evaluating data supplied from the variable-length decoding section 12. If this is the case, encoding is effected by the use of the coding parameters calculated by the MB-parameter calculating section 36 provided in the encoder 30. The process that is performed when the coding parameters are invalid will be explained, with reference to the timing chart of FIG. 5.

As shown at (a) in the timing chart of FIG. 5, a bit stream composed of pictures I2, B0, B1, P5, B3, B4, P8, B6, B7, I2, B0 and B1 arranged in the order mentioned is input to the buffer 11 of the decoder 10 in the period from time t1 to time t12.

As shown at (c) in FIG. 5, the variable-length decoding section 12 provided in the decoder 10 decodes the MB parameters at the same timing as the timing of inputting the bit stream. The MB parameters for the pictures I2, B0, B1, P5, B3, B4, P8, B6, B7, I2, B0 and B1 are decoded at times t1 to t12, respectively.

As shown at (d) in FIG. 5, a syntax error may occur at time t4 in the MB layer for the picture P5. In this case, the variable-length decoding section 12 sets the 1-bit flag for the MB layer, which is contained in the parameter-evaluating data (mb_parameter_valid), to "0" as is illustrated at (c) in FIG. 5. Then, the variable-length decoding section 12 recovers the error in the start code that follows the picture P5.

If no errors occur at picture times t1 to t3 and t5 to t12 in the MB layer contained in the parameter-evaluating data, the variable-length decoding section 12 sets the 1-bit flag for the MB layer to "1".

In the decoder 10, the memory 13 temporarily stores the MB parameters generated by the variable-length decoding section 12 as is illustrated at (f) in FIG. 5. Under the control of the control section 41, the MB parameters for the pictures I2, B0, B1, PS, B3, B4, P8, B6, B7, I2, B0 and B1 are delayed by a four-picture time with respect to the timing of inputting the bit stream. The MB parameters, thus delayed, are sequentially output to the encoder 30, respectively at picture times t5 to t16.

Further, the decoder 10 delays the image data by a one-picture time with respect to the timing of inputting the bit stream, as is illustrated at (b) in FIG. 5. Pictures B0, B1, I2, B3, B4, P5, B6, B7, P8, B0, B1 and I2 are sequentially output to the encoder 30, respectively at times t2 to t13.

As the decoder 10 processes the image data as shown at (a) to (f) in FIG. 5, the encoder 30 receives the pictures B0, B1, I2, B3, B4, P5, B6, B7 and P8 composing the image data, in the order they are mentioned, respectively at times t2 to t10, as shown at (g) in FIG. 5. The image input to the encoder 30 is not delayed with respect to the data-outputting timing illustrated at (b) in FIG. 5.

As shown at (h) in FIG. 5, the MB parameters for the pictures I2, B0, P5, B3, B4, P8, B6, B7, I2, B0 and B1 are input to the encoder 30 at times t5 to t16, respectively. These parameters are not delayed with respect to the timing of outputting the MB parameters shown at (f) in FIG. 5.

As illustrated at (i) in FIG. 5, the control section 41 determines, from the parameter-evaluating data supplied from the variable-length decoding section 12, whether or not these MB parameters are valid or invalid, at the same timing as the MB-parameter input timing illustrated at (h) in FIG. 5. At (i) in FIG. 5, "1" indicates that the control section 41 determines that the MB parameters are valid, while "0" indicates that the control section 41 determines that the MB parameters are invalid.

The control section 41 receives the parameter-evaluating data showing that the MB parameter for the picture P5 contains an error at time t4 as illustrated at (d) in FIG. 5. From the parameter-evaluating data the control section 41 determines that the picture P5 is image data item that has resulted from error concealing. The control section 41 invalidates the MB parameters for the pictures B3, B4, P8, B6 and B7 that have been predicted on the basis of the picture P5. The control section 41 determines that the MB parameters are valid, from the picture I2 that has been generated without using the picture P5. That is, the control section 41 determines that the MB parameters for the pictures I2, B0 and B1 and the MB parameters for the pictures I2, B0 and B1 input at picture times t14 to t16, respectively, are valid, and that the MB parameters for the pictures P5, B3, B4, P8, B6 and B7 input at picture times t8 to t13, respectively, are invalid.

As illustrated at (i) in FIG. 5, the control section 41 controls the switch section 37, whereby the switch section 37 is connected to the output terminal b of the decoder 10. This enables the encoding section 38 to uses the MB parameters input to the switch section 37, performing a process such as motion-vector prediction to encode the image data.

As for the pictures P5, B3, B4, P8, B6 and B7, whose MB parameters have been determined to be invalid as illustrated at (i) in FIG. 5, the, the control section 41 controls the switch section 37, thus connecting the same to the output terminal a of the MB-parameter calculating section 36. In this case, the MB parameters generated in the variable-length decoding section 12 are not used. Instead, the MB parameters calculated by the section 36 are used, thereby performing a process such as motion-vector prediction to encode the image data.

The encoder 30 outputs the bit stream the encoding section 38 has generated by performing encoding and the like. More precisely, the encoder 30 sequentially outputs the pictures I2, B0, B1, P5, B3, B4, P6, B6, B7, I2, B0 and B1 as shown at (j) in FIG. 5 at times t5 to t16, respectively. These pictures hare been delayed by a three-picture time with respect to the timing of receiving the image data, which is illustrated at (g) in FIG. 5.

In the encoder 30, the coding parameters of the picture layer need to be stored in the memory 42 for the picture time that is required for encoding the image data. In the present embodiment, the control section 41 controls the memory 42 so that the bit stream composed of GOPs, wherein M=3, may be output, delayed by the three-picture time (t2 to t4) with respect to the timing of receiving the image data.

In the image processing system 1 thus constructed, the variable-length decoding section 12 provided in the decoder 10 generates parameter-evaluating data indicating that error have made in the coding parameters of the picture layer and in the MB parameters. In accordance with the parameter-evaluating data the control section 41 can control the coding parameters that are used in the encoder 30. Hence, with the image processing system 1 it is possible to reliably encode the image data again by using the coding parameters calculated by the encoder 30, not using the coding parameters that are invalid.

To be more specific, when errors occur in the MB parameters as shown at (d) in FIG. 5, the MB parameters generated by the variable-length decoding section 12 provided in the decoder 10 are not utilized at all. Instead, the encoding section 38 uses the MB parameters the MB-parameter calculating section 36 has calculated. Thus, the image data is prevented from being encoded again by the use of invalid coding parameters.

The encoder 30 provided in the image processing system 1 that processes image data as has been explained with reference to FIGS. 3 to 5 is designed to encode image data that is composed of GOPs, in which each sub-group consists of three or less pictures and begins with either an I picture or a P picture. If image data composed of GOPs, wherein each sub-group consists of more than three pictures (M>3), is input to the encoder 30, the control section 41 converts the image data to image data in which each sub-group consists of three or less pictures (M≦3). The image data, thus generated by this conversion, is encoded.

For example, image data representing pictures I0, B1, B2, B3, B4 and B5 to be displayed in the order mentioned may be input to the encoder 30. In this case, the control section 41 converts the picture B3 to a picture P3, outputting image data that represents pictures I0, B1, B2, P3, B4 and P5 that should be displayed in the order they are mentioned. That is, the control section 41 converts the image data composed of a GOP wherein M=5 to image data composed of a GOP wherein M=3and a GOP wherein M=2.

As described above, the control section 41 change the value M by referring to the picture_coding_type of the picture parameters input to the encoder 30 in the order the pictures should be displayed, counting the B pictures input continuously and converting each third B picture to a P picture, thereby generating new coding parameters. The encoder 30 uses the new coding parameters to encode the image data again.

The image processing system 1 that processes image data as indicated above will be further described, with reference to the timing chart of FIG. 6.

As shown in the timing chart of FIG. 6, the buffer 11 of the decoder 10 receives a bit stream. The bit stream is composed of pictures I2, B0, B1, P5, B3, B4, Pa, B6, B7, B8, B9, Pd, Bb and Bc, which are input to the buffer 11 at times t1 to t14, respectively, as is illustrated at (a) in FIG. 6.

The value M of the bit stream input to the decoder 10 can be obtained by detecting the number of I pictures input after a specific I picture or the number of P pictures input after a specific P picture. As shown at (b) in FIG. 6, the number of pictures detected is "3" for the pictures I2, B0 and B1, "3" for the pictures P5, B3 and B4, "5" for the pictures Pa, B6, B7, B8 and B9, and "3" for the pictures Pd, Bb and Bc.

The variable-length decoding section 12 provided in the decoder 10 decodes the MB parameters for the pictures at the same timing as the timing of receiving the bit stream, which is illustrated at (a) in FIG. 6. That is, the section 12 decodes the MB parameters for the pictures I2, B0, B1, P5, B3, B4, Pa, B6, B7, B8, B9, Pd, Bb and Bc, in the order they are mentioned, respectively at times t1 to t14 as is illustrated at (d) in FIG. 6.

The MB parameters generated by the variable-length decoding section 12 are stored into the memory 13 and held therein temporarily. Under the control of the control section 41, the MB parameters are read from the memory 13, delayed by a four-picture time with respect to the timing of receiving the bit stream. The MB parameters for the pictures I2, B0, B1, P5, B3, B4, P8, B6, B7, I2, B0 and B1 are thereby output to the encoder 30 in the order mentioned, respectively at times t5 to t16 as is illustrated at (e) in FIG. 6.

The decoder 10 delays the pictures B0, B1, I2, B3, B4, P5, B6, B7, B8, B9, Pa, Bb, Bc and Pd by a one-picture time with respect to the timing of receiving the bit stream, as is shown at (c) in FIG. 6. These pictures, thus delayed, are output to the encoder 30 in the order they are mentioned.

The pictures B0, B1, I2, B3, B4, P5, B6, B7, B8, B9, Pa, Bb, Bc and Pd are input to the encoder 30 as shown at (f) in FIG. 6, at the same timing as the timing of receiving the image data from the decoder 10, which is illustrated at (c) in FIG. 6. More precisely, the pictures B0, B1, I2, B3, B4, P5, B6, B7, B8, B9, Pa, Bb, Bc and Pd are input to the encoder 30 in the order mentioned, respectively at times t2 to t15.

As shown at (g) in FIG. 6, the control section 41 counts the B pictures continuously input to the encoder 30 at the timing of inputting the image data to the encoder 30, which is illustrated at (f) in FIG. 6. The control section 41 resets the count to "0" when an I picture or a P picture is input to the encoder 30 or when the count reaches "3".

In other words, the control section 41 acquires counts of 1, 2, 0, 1, 2, 0, 1, 2, 3, 1, 0, 1 and 0, which correspond to the respective pictures represented by the image data input to the encoder 30 as illustrated at (f) in FIG. 6.

The control section 41 determines, from the counts shown at (g) in FIG. 6, whether or not the value M of the image data should be changed or not. To be more specific, if any count becomes "3", the control section 41 determines that the value M should be changed. The section 41 changes the picture B8 whose count is "3" at picture time T10, to a P picture as is illustrated at (h) in FIG. 6, thereby changing the value M.

To change a B picture to a P picture as in this instance, the control section 41 determines the picture_coding_type for each picture as shown at (i) in FIG. 6, on the basis of the counts that are shown at (g) in FIG. 6. In this instance, the control section 41 changes the picture B8 at picture time t 10 to a P picture, thereby altering the picture type shown at (f) in FIG. 6 to P picture type.

The control section 41 controls the encoding section 38, causing the same to encode the image data again in accordance with the picture type determined on the basis of the counts, irrespective of the MB parameters input to the encoder 30 from the decoder 10.

As shown at (j) in FIG. 6, the MB parameters for the pictures I2, B0, B1, P5, B3, B4, Pa, B6, B7, B9, Pd, Bb and Bc are sequentially input to the encoder 30 at picture times t5 to t18, respectively, not delayed with respect to the timing outputting the MB parameters as is illustrated at (e) in FIG. 6.

As illustrated at (k) in FIG. 6, the control section 41 determines whether the MB parameters supplied from the variable-length decoding section 12 are valid or invalid, on the basis of the parameter-evaluating data supplied from the section 12, at the same timing as the timing of inputting the MB parameters as shown at (j) in FIG. 6. At (k) in FIG. 6, "1" indicates that the control section 41 determines that the MB parameters are valid, while "0" indicates that the control section 41 determines that the MB parameters are invalid.

Assume the picture B is changed to a P picture at the picture time t10 as is shown at (i) in FIG. 6. Then, the control section 41 determines that the MB parameters (e.g., motion vectors or the like) for the pictures following the B picture and preceding the P picture in time sequence are invalid, from the B picture immediately following the B picture that has been changed.

That is, the control section 41 determines that the MB parameter for the picture B8, the MB parameters for the pictures B6, B7 B9 and Pa that continue to the pictures B8 when the count for the picture B8 is 3 are invalid, and that the MB parameters for all other pictures are valid.

The control section 41 controls the encoding section 38, which encodes the image data again, by using the MB parameters calculated by the MB-parameter calculating section 36, for the pictures corresponding to the MB parameters that have been determined to be invalid, and by using the MB parameters calculated by the MB-parameter supplied from the decoder 10, for the pictures corresponding to the MB parameters that have been determined to be valid.

More precisely, the control section 41 controls the switch section 37, thus connecting the same to the output terminal a of the MB-parameter calculating section 36, for the pictures B6 to Pa whose for which the MB parameters have been input from the decoder 10 and have been determined to be invalid. The section 41 does not use the MB parameters generated by the variable-length decoding section 12 and input to the encoder 30. Instead, the section 41 uses the MB parameters (picture_coding_type) calculated by the MB-parameter calculating section 36, thus controlling the switch section 37. Thus controlled, the encoding section 38 performs a process such as motion-vector prediction, encoding the image data.

The control section 41 applies the MB parameters input to the switch section 37 from the variable-length decoding section 12, to the pictures that have been input from the decoder 10. The encoding section 38 uses these MB parameters, carrying out a process such as motion-vector prediction, encoding the image data.

In the encoder 30, the encoding section 38 delays the bit stream that has been generated in a process, such as encoding. To be more specific, the encoding section 38 delays the bit stream by a three-picture time with respect to the image-data input timing shown at (f) in FIG. 6. The pictures I2, B0, B1, P5, B3, B4, P8, B7, Pa, B9, Pd, Bb and Bc are thereby output at picture times t5 to t18, respectively, as is illustrated at (1) in FIG. 6.

It is necessary to store the coding parameters of the picture layer in the memory 42 provided in the encoder 30, for the picture time required for encoding the image data. In the present embodiment, the control section 41 effects such control that a bit stream composed of GOPs, wherein M=3, is output, delayed by a three-picture time (t2 to t4) with respect to the timing of inputting the image data.

In the image processing system 1 that performs the processes described above, the encoder 30 is one that is designed to encode image data representing GOPs, wherein M is 3 or less. If image data representing GOPs, wherein M exceeds 3, is input from the decoder 10 to the encoder 30, the B picture is changed to a P picture, thus converting the image data to one representing GOPs, wherein M is 3 or less. In this case, too, the encoder 30 can encode the image data again accurately, by using the coding parameters calculated by the MB-parameter calculating section 36.

Thus, with the image processing system it is possible to change the coding parameters to encode the image data again by using the coding parameters calculated by the MB-parameter calculating section, even if the coding parameters, which have been input from the decoder 10, are ones that cannot be encoded in the encoder 30.

The encoder 30 calculates an average quantization scale for each of the pictures encoded by the encoding section 38, even if some of the MB parameters input from the decoder 10 are encoded again by the use of a quantization scale. At this time, the encoder 30 detects the flag indicating that the quantization scale is valid and calculates an average quantization scale for each picture by using only the quantization scale which is valid and which has no error flags. The average quantization scale, thus calculated, will be utilized to determine how it is difficult or easy for the variable-length encoding section 39 to encode the image data in accordance with rate control. The degree of difficulty or easiness, determined from the average quantization scale calculated as described above, can therefore be utilized in the rate control, when the process mode is changed from one wherein the image data is encoded by using the quantization scale input from the decoder 10, to one wherein the image data is encoded by using the quantization scale calculated by the MB-parameter calculating section 36.

In the image processing system 1 according to the present invention, the variable-length decoding section 12 generates parameter-evaluating data for the picture layer and for the MB layer, as has been described above. Nonetheless, the section 12 may generate parameter-evaluating data for other layers such as a GOP layer and a slice layer, both according with the MPEG standards. In the image processing system 1, the control section 41 refers to the parameter-evaluating data corresponding to each layer, thereby determine whether the image data should be encoded again in the decoder 30 by using the coding parameters supplied from the decoder 10 or the coding parameters generated by the MB-parameter calculating section 36. Hence, the encoder 30 can encode the image data gain accurately.

Furthermore, in the image processing system 1 of this invention, the variable-length decoding section 12 generates parameter-evaluating data and outputs the same to the control section 41. The invention is not limited to this embodiment. Rather, parameter-evaluating data may be written a signal part that is not effective image data, such as a blanking portion of the image data or the LSB (Least Significant Bit) of the macro signal and may be input from the decoder 10 to the encoder 30. In this case it is desired that the variable-length decoding section 12 should write not only the parameter-evaluating data, but also the coding parameters of the picture layer and the MB parameters in that part of the image data which is other than the effective part.

Another image processing system 100 according to the present invention will be described. This image processing system is designed not to decode the input bit stream to image data, but to first decode the bit stream to coded data and then encode the coded data further.

Figure 7:
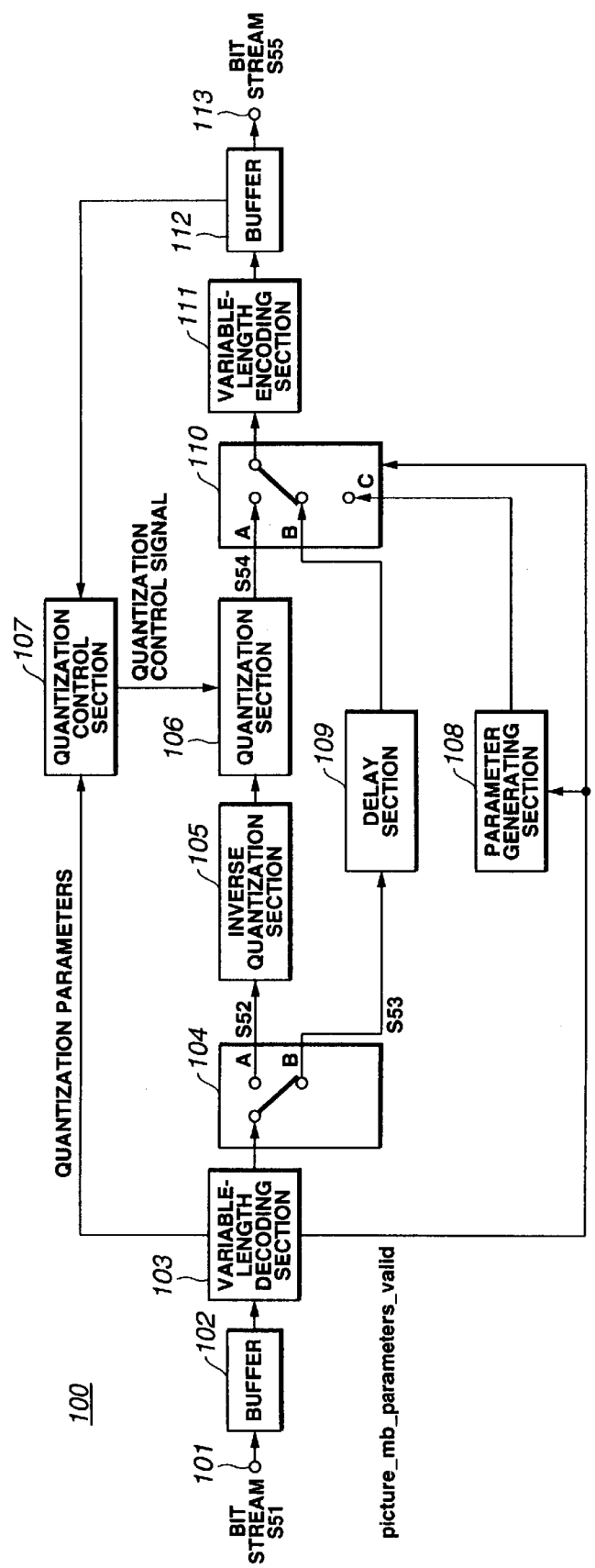
FIG. 7 is a block diagram depicting an image processing system according to the present invention.

As shown in FIG. 7, the image processing system 100 comprises a buffer 102, a variable-length decoding section 103, a switch section 104, an inverse quantization section 105, a quantization section 106, a quantization control section 107, a parameter generating section 108, a delay section 109, a switch section 110, a variable-length encoding section 111, and a buffer 112. The buffer 102 receives a bit stream input via the input terminal 101. The variable-length decoding section 103 perform variable-length decoding on the bit stream supplied from the buffer 102, generating image data that is composed of quantized DCT coefficients. The switch section 104 is provided to supply the image data S52 generated by the variable-length decoding section 103, to the inverse quantization section 105, and to supply data S53 other than the image data S52 to the delay section 109. The inverse quantization section 105 effects inverse quantization on the image data supplied from the switch section 104, thereby generating image data that is composed of quantized DCT coefficients. The quantization section 106 carries out quantization on the image data supplied from the inverse quantization section 105, thus generating image data S54 composed of quantized DCT coefficients. The quantization control section 107 controls the quantization section 106 in accordance with the quantization parameters supplied from the variable-length decoding section 103. The parameter generating section 108 generates coding parameters from the parameter-evaluating data supplied from variable-length decoding section 103. The delay section 109 receives the image S53 other than the image data S52, from the switch section 104. The switch section 110 is designed to output the image data S54 supplied from the quantization section 106, the data S53 delayed by the delay section 109 and the coding parameters generated by the parameter generating section 108. The variable-length encoding section 111 performs variable-length encoding on the image data supplied from the switch section 110, thereby generating a bit stream S55. The buffer 112 is provided to temporarily store the bit stream supplied from the variable-length encoding section 111 and outputs the bit stream to the output terminal 113. From the output terminal 113 the bit stream is output to an external apparatus.

In the image processing system 100 thus structured, the variable-length decoding section 103 performs the same process as the above-mentioned variable-length decoding section 12. More specifically, the section 103 performs variable length decoding on the bit stream in units of, for example, macro blocks (MBs), obtaining image data composed of quantization coefficients. The image data thus obtained is output to the switch section 104.

The variable-length decoding section 103 performs not only variable length decoding, but also detects the coding parameters (MB_parameters) added to each MB layer and the coding parameters (Sequence_GOP_picture_parameters) of a picture layer. The MB parameters and the coding parameters are output to the switch section 104. Further, the variable-length decoding section 102 generates parameter-evaluating data (picture_mb_parameter_valid) that indicates whether the coding parameters of the picture layer and the MB parameters are valid or not. This data is output to the parameter generating section 108 and the switch section 104.

The switch section 104 operates in response to a control signal supplied from a control section (not shown). When the switch section 104 is connected to the input terminal A of the inverse quantization section 105, the image data is supplied from the variable-length decoding section 103 to the inverse quantization section 105. When the switch section 194 is connected to the input terminal B of the delay section 109, the coding parameters are supplied from the variable-length decoding section 103 to the delay section 109.

The inverse quantization section 105 effects inverse quantization on the image data composed of quantized DCT coefficients and supplied from the switch section 104, in units of, for example, pixel blocks each consisting of 8×8 pixels. More precisely, the inverse quantization section 105 performs, on the image data, inverse quantization in which the image data is multiplied by the quantization step, thereby generating DCT coefficients. The image data thus quantized is output to the quantization section 106.

The quantization section 106 quantizes the image data supplied from the inverse quantization section 105 and composed of DCT coefficients, thereby generating image data S54 composed of quantized DCT coefficients. The image data S54 is output to the switch section 110.

The delay section 109 delays the timing of inputting the coding parameters to the switch section 110, by the time the inverse quantization section 105 and the quantization section 106 requires to perform their respective functions. The coding parameters thus delayed are output to the switch section 110.

The quantization control section 107 calculates the percentage of the storage area that data bits occupy in the buffer 112, from the quantized parameters supplied from the variable-length decoding section 103. The section 107 generates a quantization control signal from the percentage of the bit-occupied storage area. This control signal designates the quantization scale that the quantization section 106 should use to quantize the image data supplied from the inverse quantization section 105 so that the bit stream S55 may be output from the output terminal 112 at a rate equal to or lower than a prescribed bit rate.

It is desired that the quantization control section 107 should control the quantization scale to mitigate the matching error of the bit stream S55. The matching error has inevitably resulted from the motion compensation of image that is effected in the course of encoding or decoding the image data.

The parameter generating section 108 generates coding parameters from the parameter-evaluating data supplied from the variable-length decoding section 103. That is, the parameter generating section 108 generates, from the parameter-evaluating data, the coding parameters of the layer in which errors have occurred. The coding parameters thus generated are output to the switch section 110.

The switch section 110 is connected to the output terminal A of the quantization section 106, the output terminal B of the delay section 109, or the output terminal C of the parameter generating section 108, in accordance with the parameter-evaluating data supplied from the variable-length decoding section 103 and the control signal supplied from the control section (not shown). The switch section 110 is connected to the output terminal B to output the coding parameters supplied from the delay section 109, when it is determined from the parameter-evaluating data that the coding parameters generated by the variable-length decoding section 103 are valid. When it is determined from the parameter-evaluating data that the coding parameters generated by the variable-length decoding section 103 are invalid, the switch section 110 is connected to the terminal C so that the coding parameters may be supplied from the parameter generating section 108 to the variable-length encoding section 111.

The variable-length encoding section 111 performs variable-length encoding on the image data supplied from the switch section 110, generating a bit stream. The bit stream thus generated is output to the buffer 12. The bit stream is output at a desired rate from the system 100 through the output terminal 113.

It will be described how the image processing system 100 operates when the bit stream input to the input terminal 101 has no syntax errors.

The flag the variable-length decoding section 103 generates at this time for the parameter-evaluating data is "11" as clearly seen from Table 1. This means that the picture layer nor MB parameters of the bit stream which has been processed by the variable-length decoding section 103 have no errors and are, therefore, valid. In this case, the variable-length encoding section 111 uses the coding parameters generated by the variable-length decoding section 103, thereby effecting variable-length encoding on the image data again. Thus, the section 111 generates a bit stream S55 at a different bit rate.

It will be now described how the image processing system 100 operates when the bit stream input to the input terminal 101 has a syntax error.

When a syntax error occurs in the bit stream input, the variable-length decoding section 103 sets the flag for the parameter-evaluating data at "00" or "10". At this time, the parameter generating section 108 outputs the header of a P picture if the error has occurred in an I picture or a P picture. In this case, the section 108 outputs to the switch section 110 an MB parameter that designates a skip macro block.

The error may be one that has occurred at a B picture. If this is the case, the parameter generating section 108 outputs the header of the B picture and outputs an MB parameter to the switch section 110. The MB parameter indicates that the motion vector is "0" and has no DCT coefficients. The switch section 111 outputs the coding parameter input to the terminal A to the variable-length encoding section 111, along with the coding parameter input to the terminal C, in accordance with the parameter-evaluating data. The variable-length encoding section 111, therefore, encodes the image data again, changing the bit rate. Thus, the section 111 generates the bit stream S55.

It will be described below how the image processing system 100 operates if a syntax error of an MB layer occurs in the bit stream input to the input terminal 101.

The parameter-evaluating data may show that the error of the MB layer may occur in an I picture in the image processing system 100. If so, the parameter generating section 108 outputs to the switch section 110 the coding parameter of the macro block next to the macro block having an error, as the coding parameter of the macro block that has the error.

If an error occurs in a P picture, the parameter generating section 108 outputs an MB parameter to the switch section 110. This MB parameter designates a skip macro block.

An error may occurs in a B picture. In this case, the parameter generating section 108 outputs an MB parameter to the switch section 110. This MB parameter indicates that the motion vector is "0" and has no DCT coefficients. In accordance with the parameter-evaluating data, the switch section 110 outputs the coding parameter input to the terminal A, together with the coding parameter input to the terminal C, to the variable-length encoding section 111. The variable-length encoding section 111 encodes the image data again, generating a bit stream that has a different bit rate.

In the image processing system 100 thus structure, the parameter generating section 108 generates a picture layer and MB parameters from the parameter-evaluating data generated by the variable-length decoding section 103, even if the bit stream input has syntax errors. Therefore, the image data can be encoded again, generating a bit stream having no syntax errors. The bit stream is output from the system 100 through the output terminal 113.

What is claimed is:

1. A decoding apparatus comprising:
   decoding means for decoding an input bit stream to generate image data;
   parameter generating means for generating coding parameters of each layer, to be used to encode the image data again, which has been generated by the decoding means; and
   error flag generating means for generating an error flag which indicates whether the coding parameters generated for each layer by the parameter generating means can be effectively used to encode the image data again;
   whereby the operation of encoding the image data again includes counting a number of times that image data corresponding to a picture-coding type employed in the prior coding is continuously input from said decoding means, and the operation of generating said coding parameters is performed in accordance with the count; and whereby when a predetermined number of pictures of one type are continuously input from said decoding means, the picture coding type is changed for at least one of said predetermined number of pictures of said one type.

2. The decoding apparatus according to claim 1, wherein the error flag generating means generates an error flag for the encoding parameters of a picture layer and a macro block layer, both according with MPEG2 standards.

3. A decoding method comprising:

decoding an input bit stream to generate image data;

generating coding parameters of each layer, to be used to encode the image data again; and generating an error flag which indicates whether the coding parameters generated for each layer can be effectively used to encode the image data again;

whereby the operation of encoding the image data again includes counting a number of times that image data corresponding to a picture-coding type employed in the prior coding is continuously input from the decoding step, and the operation of generating coding parameters in accordance with the count; and whereby when a predetermined number of pictures of one type are continuously input from said decoding step, the picture coding type is changed for at least one of said predetermined number of pictures of said one type.

4. A decoding method according to claim 3, wherein the error flag is generated for the encoding parameters of a picture layer and a macro block layer, both according with MPEG2 standards.

5. An encoding apparatus comprising:

parameter evaluating means for determining whether coding parameters for each layer, which have been input from a decoding apparatus, can be used effectively to encode image data input from the decoding apparatus, from an error flag that indicates whether the coding parameters can be used effectively;

parameter calculating means for calculating coding parameters from the image data supplied from the decoding apparatus, in accordance with data supplied from the parameter evaluating means and indicating that the coding parameters are invalid; and encoding means for encoding the image data by using the coding parameters input from the decoding apparatus when the parameter-evaluating mean determines that the coding parameters supplied from the decoding apparatus are valid, and by using the coding parameters generated by the parameter calculating means when the parameter-evaluating mean determines that the coding parameters supplied from the decoding apparatus are invalid;

whereby the operation of encoding the image data again includes counting a number of times that image data corresponding to a picture-coding type employed in the prior coding is continuously input from said decoding apparatus, and the operation of calculating said coding parameters is performed in accordance with the count; and whereby when a predetermined number of pictures of one type are continuously input from said decoding apparatus, the picture coding type is changed for at least one of said predetermined number of pictures of said one type.

6. The encoding apparatus according to claim 5, wherein the error flag generating means generates an error flag for the encoding parameters of a picture layer and a macro block layer, both according with MPEG2 standards.

7. The encoding apparatus according to claim 5, further comprising a picture type determining means for determining the type of the image data representing a picture to which the error flag supplied from the decoding apparatus is added, and the parameter evaluating means determines that the coding parameters for image data representing a picture generated from the picture, to which the flag error is added, are invalid, on the basis of data supplied from the picture type determining means and representing the picture type of the image data to which the error flag is added.

8. An encoding apparatus comprising:

counting means for counting a number of times that image data corresponding to a picture-coding type employed in the prior coding is continuously input from a decoding apparatus;

picture type changing means for generating coding parameters in accordance with data supplied from the counting means and indicating that the count of the counting means has reached a predetermined value, so that the image data may be encoded to image data of a different picture type; and encoding means for encoding the image data by using the coding parameters supplied from the picture type changing means;

whereby when a predetermined number of pictures of one type are continuously input from said decoding apparatus, the picture coding type is changed for at least one of said predetermined number of pictures of said one type.

9. An encoding method comprising:

a process of determining whether coding parameters for each layer, which have been input from a decoding apparatus, can be used effectively to encode image data input from the decoding apparatus, from an error flag that indicates whether the coding parameters can be used effectively;

a process of calculating coding parameters from the image data supplied from the decoding apparatus, in accordance with data indicating that the coding parameters supplied from the decoding apparatus are invalid; and a process of encoding the image data by using the coding parameters input from the decoding apparatus when the coding parameters supplied from the decoding apparatus are determined to be valid, and by using the coding parameters generated in the process of calculating coding parameters when the coding parameters supplied from the decoding apparatus are determined to be invalid;

whereby the operation of encoding the image data again includes counting a number of times that image data corresponding to a picture-coding type employed in the prior coding is continuously input from said decoding apparatus, and the operation of calculating said coding parameters is performed in accordance with the count; and whereby when a predetermined number of pictures of one type are continuously input from said decoding apparatus, the picture coding type is changed for at least one of said predetermined number of pictures of said one type.

10. The encoding method according to claim 9, wherein the error flag is a flag for the encoding parameters of a picture layer and a macro block layer, both according with MPEG2 standards.

11. The encoding method according to claim 9, further comprising a process of determining the type of the image data representing a picture to which the error flag supplied from the decoding apparatus is added, and in the process of determining, it is determined that the coding parameters for image data representing a picture generated from the picture, to which the flag error is added, are invalid, on the basis of data supplied from the picture type determining means and representing the picture type of the image data to which the error flag is added.

12. An encoding method comprising:

counting a number of times that image data corresponding to a picture-coding type employed in the prior coding is continuously input from a decoding apparatus;

generating coding parameters in accordance with data supplied from the counting means and indicating that the count of the counting means has reached a predetermined value, so that the image data may be encoded to image data of a different picture type; and encoding the image data by using the coding parameters supplied from the picture type changing means; and whereby when a predetermined number of pictures of one type are continuously input from said decoding apparatus, the picture coding type is changed for at least one of said predetermined number of pictures of said one type.

13. An image processing system comprising:

an decoding apparatus comprising:

decoding means for decoding an input bit stream to generate image data;

parameter generating means for generating coding parameters of each layer, to be used to encode the image data again, which has been generated by the decoding means; and error flag generating means for generating an error flag which indicates whether the coding parameters generated for each layer by the parameter generating means can be effectively used to encode the image data again; and an encoding apparatus comprising:

parameter evaluating means for determining whether coding parameters for each layer, which have been input from a decoding apparatus, can be used effectively to encode image data input from the decoding apparatus, from an error flag that indicates whether the coding parameters can be used effectively;

parameter calculating means for calculating coding parameters from the image data supplied from the decoding apparatus, in accordance with data supplied from the parameter evaluating means and indicating that the coding parameters are invalid; and encoding means for encoding the image data by using the coding parameters input from the decoding apparatus when the parameter-evaluating mean determines that the coding parameters supplied from the decoding apparatus are valid, and by using the coding parameters generated by the parameter calculating means when the parameter-evaluating mean determines that the coding parameters supplied from the decoding apparatus are invalid;

whereby the operation of encoding the image data again includes counting a number of times that image data corresponding to a picture-coding type employed in the prior coding is continuously input from said decoding apparatus, and the operation of calculating said coding parameters is performed in accordance with the count; and whereby when a predetermined number of pictures of one type are continuously input from said decoding apparatus, the picture coding type is changed for at least one of said predetermined number of pictures of said one type.

14. The image processing system according to claim 13, wherein the error flag generating means generates an error flag for the encoding parameters of a picture layer and a macro block layer, both according with MPEG2 standards.

15. The image processing system according to claim 13, wherein the encoding apparatus further comprises a picture type determining means for determining the type of the image data presenting a picture to which the error flag supplied from the decoding apparatus is added, and the parameter evaluating means provided in the encoding apparatus determines that the coding parameters for image data representing a picture generated from the picture, to which the flag error is added, are invalid, on the basis of data supplied from the picture type determining means and representing the picture type of the image data to which the error flag is added.

16. An image processing system comprising:

decoding means for decoding an input bit stream to generate image data;

inverse quantization means for performing inverse quantization on the image data supplied from the decoding means, thereby to generate DCT coefficients;

quantization means for performing quantization on the DCT coefficients supplied from the inverse quantization means, thereby to generated image data;

parameter generating means for generating coding parameters for each layer, to be used to encode the image data decoded by the decoding means;

error flag generating means for generating an error flag which indicates whether the coding parameters generated for each layer by the parameter generating means can be effectively used to encode the image data again;

calculating means for calculating coding parameters in accordance with the error flag supplied from the error flag generating means;

encoding means for encoding the image data supplied from the quantization means, by using the coding parameters supplied from the parameter generating means or the calculating means; and control means for causing the encoding means to encode the image data by using the coding parameters generated by the parameter generating means, when the encoding parameters are determined to be valid, from the error flag generated by the error flag generating means, and by using the coding parameters generated by the calculating means, when the encoding parameters generated by the parameter generating means are determined to be invalid, from the error flag generated by the error flag generating means.

17. The image processing system according to claim 16, further comprising:

a video buffer for outputting the bit stream encoded by the encoding means, at a rate equal to or lower than a prescribed bit rate; and quantization control means for controlling a quantization step at which the quantization means quantizes the image data so that the video buffer may output the bit stream at a rate equal to or lower than the prescribed bit rate, in accordance with a percentage of a storage area that data bits occupy in the video buffer.

18. An image processing method comprising:

a process of decoding an input bit stream to generate image data, generating coding parameters of each layer, to be used to encode the image data again, and an error flag which indicates whether the coding parameters generated for each layer may be effectively used to encode the image data again;

a process of performing inverse quantization on the image data supplied from the decoding means, thereby to generate DCT coefficients;

a process of performing quantization on the DCT coefficients supplied from the inverse quantization means, thereby to generated image data;

a process of calculating coding parameters in accordance with the error flag; and a process of encoding the image data by using the coding parameters generated in the process of decoding the input bit stream, when it is determined from the error flat that the encoding parameters are valid, and by using the coding parameters generated in the process of calculating coding parameters, when it is determined from the error flat that the encoding parameters are invalid.

19. The image processing method according to claim 18, wherein a quantization step, at which the image data is quantized in the process of performing quantization, is controlled to output the encoded bit stream at a rate equal to or lower than the prescribed bit rate from a video buffer, in accordance with a percentage of a storage are a that data bits occupy in the video buffer.

* * * * *